(12) United States Patent
Yamagishi et al.

(10) Patent No.: US 7,127,398 B1
(45) Date of Patent: Oct. 24, 2006

(54) INTERACTIVE SYSTEM, INTERACTIVE METHOD, TWO-WAY INTERACTIVE SYSTEM, TWO-WAY INTERACTIVE METHOD AND RECORDING MEDIUM

(75) Inventors: Kiichiro Yamagishi, Shizuoka-ken (JP); Toshihiko Murata, Shizuoka-ken (JP); Takeshi Nakamura, Tokyo (JP); Toshihide Fujimaki, Tokyo (JP)

(73) Assignee: Adin Research, Inc., Tokyo (JP)

( * ) Notice: Subject to any disclaimer, the term of this patent is extended or adjusted under 35 U.S.C. 154(b) by 867 days.

(21) Appl. No.: 09/697,146

(22) Filed: Oct. 27, 2000

(30) Foreign Application Priority Data

Oct. 29, 1999 (JP) .............................. P11-310139

(51) Int. Cl.
*G10L 21/00* (2006.01)
(52) U.S. Cl. ........................ 704/270; 275/231; 275/257
(58) Field of Classification Search ................ 704/270, 704/275, 231, 257
See application file for complete search history.

(56) References Cited

U.S. PATENT DOCUMENTS

| | | | | |
|---|---|---|---|---|
| 5,577,165 A | * | 11/1996 | Takebayashi et al. | 704/275 |
| 5,748,841 A | * | 5/1998 | Morin et al. | 704/257 |
| 5,946,658 A | * | 8/1999 | Miyazawa et al. | 704/275 |
| 6,104,989 A | * | 8/2000 | Kanevsky et al. | 704/9 |
| 6,173,266 B1 | * | 1/2001 | Marx et al. | 704/270 |
| 6,185,527 B1 | * | 2/2001 | Petkovic et al. | 704/231 |
| 6,236,968 B1 | * | 5/2001 | Kanevsky et al. | 704/275 |
| 6,330,539 B1 | * | 12/2001 | Takayama et al. | 704/275 |
| 6,408,272 B1 | * | 6/2002 | White et al. | 704/270.1 |
| 6,446,076 B1 | * | 9/2002 | Burkey et al. | 707/102 |
| 6,484,136 B1 | * | 11/2002 | Kanevsky et al. | 704/9 |
| 6,505,162 B1 | * | 1/2003 | Wang et al. | 704/275 |
| 6,584,439 B1 | * | 6/2003 | Geilhufe et al. | 704/270 |

FOREIGN PATENT DOCUMENTS

| JP | 6-239186 | 8/1994 |
|---|---|---|
| JP | 11-9847 | 1/1999 |

OTHER PUBLICATIONS

Garner et al., "A Theory of Word Frequencies and Its Application to Dialogue Move Recognition", Proceedings in the 1996 International Conference of Spoken Language Proceeding, vol. 3, Oct. 1996, pp. 1880-1883.*

* cited by examiner

*Primary Examiner*—Richemond Dorvil
*Assistant Examiner*—Qi Han
(74) *Attorney, Agent, or Firm*—Finnegan, Henderson, Farabow, Garrett & Dunner, L.L.P.

(57) ABSTRACT

The present invention includes a microphone 1 inputting voice uttered by a user; a voice recognition processing section 3 recognizing the voice inputted by the microphone 1, and converting the recognized voice into an input symbol string; a conversation pattern processing section 5 inputting the input symbol string from the voice recognition processing section 3, and outputting an output symbol string corresponding to the input symbol string based on a conversation pattern described in advance; a voice synthesis processing section 7 converting the output symbol string from the conversation pattern processing section 5 into voice; a speaker 9 outputting and uttering the voice from the voice synthesis processing section 7; and a conversation learning section 41 grasping conversation characteristics of the user based on the input symbol string from the conversation pattern processing section 5, and changing the output symbol string in accordance with the grasped conversation characteristics.

21 Claims, 12 Drawing Sheets

FIG.3

38 EVENT DATA TABLE

| REGISTRATION TIME STAMP | ACQUISITION MEANS | NUMBER OF DATA | DATA[0]=DATA NAME | | DATA[1]=ATTRIBUTE 1 | | DATA[2]=ATTRIBUTE 2 | |
|---|---|---|---|---|---|---|---|---|
| | | | ATTRIBUTE ID | ATTRIBUTE VALUE | ATTRIBUTE ID | ATTRIBUTE VALUE | ATTRIBUTE ID | ATTRIBUTE VALUE |
| 1999.7.20.0:00 | SYSTEM REGISTRATION | 3 | 1001 | SHINJO | 1002 | HANSHIN | 1004 | CENTER FIELDER |
| 1999.7.20.0:00 | SYSTEM REGISTRATION | 3 | 1001 | YABU | 1002 | HANSHIN | 1004 | PITCHER |
| ... | | | | | | | | |
| 1999.7.25.16:00 | USER UTTERANCE | 1 | 1 | SAPPORO | | | | |
| 1999.7.25.16:20 | CHARACTER BROADCASTING | 2 | 20 | FINE WEATHER | 2 | JULY 21 | | |
| ... | | | | | | | | |

FIG.4

EVENT ATTRIBUTE TABLE 39

| ATTRIBUTE ID | ATTRIBUTE NAME |
|---|---|
| 1 | DESTINATION |
| 2 | DATE |
| ⋮ | |
| 20 | WEATHER |
| ⋮ | |
| 1001 | NAME OF PLAYER: BASEBALL |
| 1002 | TEAM NAME: BASEBALL |
| 1003 | BATTING AVERAGE: BASEBALL |
| 1004 | POSITION: BASEBALL |
| ⋮ | |

INTERACTIVE SYSTEM, INTERACTIVE METHOD, TWO-WAY INTERACTIVE SYSTEM, TWO-WAY INTERACTIVE METHOD AND RECORDING MEDIUM

BACKGROUND OF THE INVENTION

1. Field of the Invention

The present invention relates to an interactive system and an interactive method for conducting an interactive processing for interaction with a user, a two-way interactive system and a two-way interactive method for establishing communication between interactive systems, and a recording medium.

2. Description of the Related Art

As conventional interactive systems of this type, there are known, for example, a talkative parrot sounding device described in Japanese Patent Application Laid-Open Publication No. 11-9847 and an on-vehicle electronic equipment described in Japanese Patent Application Laid-Open Publication No. 6-239186.

The talkative parrot sounding device converts a voice signal inputted as voice into a text using voice/text conversion means, adds a response attribute inputted by response attribute input means with the text as a talking-to text or a response text, and registers the response attribute in database. In response, the response text is retrieved while using the talking-to text which has been converted into a text from the voice/text conversion means and the response attribute from the response attribute input means as retrieval keys. The retrieved response text is converted into a voice signal by means for converting a response text into voice and outputted as voice from voice output means. Accordingly, it is possible to respond to talking-to by the same word or a specific word and to make the user feel as if an actual parrot is responding.

Also, the on-vehicle electronic equipment stores a plurality of first language words, stores a plurality of second language words different from the first language words in response to the first language words in order to recognize speaker's voice, retrieves a second language word in a second language dictionary in response to a word recognized based on a first language word, and synthesizes the retrieved word into voice to output it. By doing so, it is possible to prevent a driver from falling into a doze.

Further, an interactive system for changing an internal state by a recognition word recognizing voice inputted from a user and changing a to-be-uttered word according to the changed internal state, is utilized in game equipment and the like.

This interactive system has a microphone inputting a voice uttered by a user, a voice recognition/processing section recognizing the voice inputted from the microphone and converting the recognized voice into a symbol string, a conversation pattern processing section controlling a conversation with the user based on the symbol string converted by the voice recognition/processing section and outputting a symbol string suited for the user to a voice synthesis processing section, the voice synthesis processing section converting the symbol string from the conversation pattern processing section into voice, and a speaker outputting and uttering the voice from the voice synthesis processing section.

The conversation pattern processing section has a pattern driving section and an internal model. The pattern driving section inputs a symbol string from the voice recognition processing section and outputs a symbol string corresponding to the inputted symbol string based on a conversation pattern described in advance. If the pattern driving section has detected, for example, a specific word, the internal model inputs trigger information from the pattern driving section, changes a model value indicating an internal state in response to the trigger information and outputs the changed model value to the pattern driving section. The pattern driving section inputs the model value from the internal model, refers to the model value during the processing of the conversation and changes words according to a conditional expression or the like described in a conversation pattern.

Nevertheless, according to the conventional talkative parrot sounding device and the on-vehicle electronic equipment stated above, the voice word of the user is inputted and a preset word corresponding to the inputted word is outputted. Due to this, if the same word is inputted, the corresponding same word is outputted. Since logic for generating an outputted word from an inputted word is finite and the range of conversation is restricted if the number of outputted words is small, a user is bored with the conversation.

Further, according to the interactive system stated above, the model value can be changed and a word uttered by the system can be changed. However, the change of words depends on the rule held by the system and does not yet reach a level at which a user is not bored with conversation.

SUMMARY OF THE INVENTION

It is an object of the present invention to provide an interactive system, an interactive method, a two-way interactive system, a two-way interactive method and a recording medium capable of conducting an interactive processing which does not bore a user by changing words and the like uttered by the system and thereby realizing the removal of the boredom of the user such as a driver, the prevention of the user from falling into a doze and the like.

To obtain the above objects, the present invention is constituted as follows.

An interactive system recited in a first aspect is characterized by comprising: a voice input section inputting voice uttered by a user; a voice recognition processing section recognizing the voice inputted by the voice input section, and converting the recognized voice into an input symbol string; a conversation pattern processing section inputting the input symbol string from the voice recognition processing section, and outputting an output symbol string corresponding to the input symbol string based on a conversation pattern described in advance; a voice synthesis processing section converting the output symbol string from the conversation pattern processing section into voice; a voice output section outputting and uttering the voice from the voice synthesis processing section; and a conversation characteristic control section grasping conversation characteristics of the user based on the input symbol string from the conversation pattern processing section, and changing the output symbol string in accordance with the grasped conversation characteristics.

According to the invention recited in the first aspect, the conversation characteristic control section grasps user's conversation characteristics based on the input signal string from the conversation pattern processing section and changes the output symbol string in accordance with the grasped conversation characteristics. Due to this, the system can conduct an interactive processing in accordance with the individual users' characteristics. It is, therefore, possible to conduct an interactive processing which does not bore the user and to thereby realize the removal of the boredom of the user such as a driver, the prevention of the user from falling into a doze and the like.

An interactive system recited in a second aspect based on the first aspect is characterized in that the conversation characteristic control section optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user. This allows the system to conduct an interactive processing in accordance with the characteristics of individual users.

An interactive system recited in a third aspect is characterized by comprising: a voice input section inputting voice uttered by a user; a voice recognition processing section recognizing the voice inputted by the voice input section, and converting the recognized voice into an input symbol string; a conversation pattern processing section inputting the input symbol string from the voice recognition processing section, and outputting an output symbol string corresponding to the input symbol string based on a conversation pattern described in advance; a voice synthesis processing section converting the output symbol string from the conversation pattern processing section into voice; a voice output section outputting and uttering the voice from the voice synthesis processing section; a storage section storing synonyms and relevant words synonymous with and relevant to words uttered by the user; and an association function section extracting the synonyms and relevant words synonymous with and relevant to words uttered by the user from the storage section based on the input symbol string from the conversation pattern processing section, and outputting the extracted synonyms and relevant words to the conversation pattern processing section.

According to the invention recited in the third aspect, the association function section extracts synonyms/relevant words synonymous with and relevant to the words uttered by the user based on the input symbol string from the conversation pattern processing section and outputs the extracted synonyms/relevant words to the conversation pattern processing section. Thus, the system can select the next topic which the user appears to be able to associate from the contents of the conversation held so far and make an active utterance when the chain of interaction is broken. This can make the active utterance of the interactive system conversation not at random but having fixed continuity. Accordingly, it is possible to conduct an interactive processing which does not bore the user and thereby realize the removal of the boredom of the user such as a driver, the prevention of a user's doze and the like.

An interactive system recited in a fourth aspect is characterized by comprising: a voice input section inputting voice uttered by a user; a first voice recognition processing section recognizing the voice inputted by the voice input section, and converting the recognized voice into a first input symbol string; a conversation pattern processing section inputting the first input symbol string from the first voice recognition processing section, and outputting an output symbol string corresponding to the first input symbol string based on a conversation pattern described in advance; a voice synthesis processing section converting the output symbol string from the conversation pattern processing section into voice; a voice output section outputting and uttering the voice from the voice synthesis processing section; a second recognition processing section recognizing broadcast voice from a broadcast station, and converting the recognized broadcast voice into second input symbol strings; and an event data storage section storing the second input symbol strings as event data.

According to the invention recited in the fourth aspect, the second voice recognition processing section recognizes broadcast voice from the broadcast station, converts the recognized broadcast voice into the second input symbol string, and stores the second input string in the event data storage section as event data. Namely, by acquiring the event data, the system can provide the data which the direct user does not have. Further, since data can be acquired from voice broadcasting, it is possible to acquire event data at low cost without the need to provide a special device.

An interactive system recited in a fifth aspect based on the fourth aspect is characterized by comprising an event data processing section extracting only a symbol string desired by the user among the second input symbol strings converted by the second voice recognition section, and storing the extracted symbol string in the event data storage section.

According to the invention recited in the fifth aspect, the event data processing section extracts only a symbol string desired by the user among the second input symbol strings converted by the second voice recognition section, and stores the extracted symbol string in the event data storage section. Due to this, it is possible to acquire only the symbol string desired by the user and it suffices that the system has a low storage capacity.

An interactive system recited in a sixth aspect based on the fourth or fifth aspect, is characterized by comprising a conversation characteristic control section grasping conversation characteristics of the user based on the input symbol string from the conversation pattern processing section, and changing the output symbol string in accordance with the grasped conversation characteristics.

The invention recited in the sixth aspect can obtain the advantage of the invention recited in the first aspect in addition to the advantage recited in the fourth aspect.

An interactive system recited in a seventh aspect based on the fourth aspect, is characterized by comprising: a storage section storing synonyms and relevant words synonymous with and relevant to words uttered by the user; and an association function section extracting the synonyms and relevant words synonymous with and relevant to words uttered by the user from the storage section based on the input symbol string from the conversation pattern processing section, and outputting the extracted synonyms and relevant words to the conversation pattern processing section.

The invention recited in the seventh aspect can obtain the advantage of the invention recited in the third aspect in addition to the advantage recited in the fourth aspect.

A two-way interactive system recited in an eighth aspect comprising a plurality of interactive systems each conducting an interactive processing for interaction with a user, the respective interactive systems communicating with one another, is characterized in that each of the interactive systems comprises: a voice input section inputting voice uttered by a user; a voice recognition processing section recognizing the voice inputted by the voice input section, and converting the recognized voice into an input symbol string; a conversation pattern processing section inputting the input symbol string from the voice recognition processing section, and outputting an output symbol string corresponding to the input symbol string based on a conversation pattern described in advance; a voice synthesis processing section converting the output symbol string from the conversation pattern processing section into voice; a voice output section outputting and uttering the voice from the voice synthesis processing section; an event data transmission and reception section transmitting the input symbol string to the other interactive system as event data, and receiving event data consisting of the symbol string from the other interactive system; and an event data storage section storing the event data received by the event data transmission and reception section from the other interactive system.

According to the invention recited in the eighth aspect, the event data transmission and reception section transmits the input symbol string to another interactive system as event data, receives event data consisting of a symbol string from the other interactive system, and stores the event data received from the other interactive system in the event data storage section. Namely, systems mutually transmit and receive event data, whereby a system can acquire data from a plurality of systems and easily increase the quantity of data which can be collected.

A two-way interactive system recited in a ninth aspect based on the eighth aspect, is characterized by comprising: an input section inputting a privacy protection command of the user; and a privacy protecting function section transmitting the event data acquired by utterance of the user to the other interactive system if the privacy protection command is not inputted from the input section, and not transmitting the event data acquired by the utterance of the user to the other interactive system if the privacy protection command is inputted from the input section.

According to the invention recited in the ninth aspect, the privacy protecting function section transmits the event data acquired by the utterance of the user to the other interactive system if the privacy protection command is not inputted from the input section, and does not transmit the event data acquired by the utterance of the user to the other interactive system if the privacy protection command not inputted from the input section. It is, therefore, possible to suppress the contents and the like which the user oneself is uttered to the system from being inadvertently transmitted to other systems.

A two-way interactive system recited in a tenth aspect based on the eighth aspect, is characterized by comprising: a conversation characteristic control section grasping conversation characteristics of the user based on the input symbol string from the conversation pattern processing section, and changing the output symbol string in accordance with the grasped conversation characteristics.

The invention recited in the tenth aspect can obtain the advantage of the first aspect in addition to the advantage recited in the eighth aspect.

A two-way interactive system recited in an eleventh aspect based on the eighth aspect, is characterized by comprising: a storage section storing synonyms and relevant words synonymous with and relevant to words uttered by the user; and an association function section extracting the synonyms and relevant words synonymous with and relevant to words uttered by the user from the storage section based on the input symbol string from the conversation pattern processing section, and outputting the extracted synonyms and relevant words to the conversation pattern processing section.

The invention recited in the eleventh aspect can obtain the advantage of the third aspect in addition to the advantage recited in the eight aspect.

A two-way interactive system recited in a twelfth aspect based on the eighth aspect, is characterized by comprising: a second recognition processing section recognizing broadcast voice from a broadcast station, and converting the recognized broadcast voice into second input symbol strings; and an event data storage section storing the second input symbol strings as event data.

The invention recited in the twelfth aspect can obtain the advantage of claim 4 in addition to the advantage recited in the eighth aspect.

An interactive method recited in a thirteenth aspect is characterized by comprising: a voice recognition processing step of recognizing voice uttered by a user, and of converting the recognized voice into an input symbol string; a conversation pattern processing step of inputting the input symbol string, and of outputting an output symbol string corresponding to the input symbol string based on a conversation pattern described in advance; a voice synthesis processing step of converting the output symbol string into voice; a voice output step of outputting and uttering the voice obtained in the voice synthesis processing step; and a conversation characteristic control step of grasping conversation characteristics of the user based on the input symbol string, and of changing the output symbol string in accordance with the grasped conversation characteristics.

An interactive method recited in a fourteen aspect based on the thirteenth aspect, is characterized in that the conversation characteristic control step optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

An interactive method recited in a fifteenth aspect is characterized by comprising: a voice recognition processing step of recognizing voice uttered by a user, and of converting the recognized voice into an input symbol string; a conversation pattern processing step of inputting the input symbol string, and of outputting an output symbol string corresponding to the input symbol string based on a conversation pattern described in advance in a conversation pattern processing section; a voice synthesis processing step of converting the output symbol string into voice; a voice output step of outputting and uttering the voice obtained in the voice synthesis processing step; a storage step of storing synonyms and relevant words synonymous with and relevant to words uttered by the user; and an association function step of extracting the synonyms and relevant words synonymous with and relevant to words uttered by the user from the storage section based on the input symbol string, and of outputting the extracted synonyms and relevant words to the conversation pattern processing section.

An interactive method recited in a sixteenth aspect is characterized by comprising: a first voice recognition processing step of recognizing voice uttered by a user, and of converting the recognized voice into a first input symbol string; a conversation pattern processing step of inputting the first input symbol string, and of outputting an output symbol string corresponding to the first input symbol string based on a conversation pattern described in advance; a voice synthesis processing step of converting the output symbol string into voice; a voice output section outputting and uttering the voice obtained in the voice synthesis processing section; a second recognition processing step of recognizing broadcast voice from a broadcast station, and converting the recognized broadcast voice into second input symbol strings; and an event data storage step of storing the second input symbol strings as event data.

An interactive method recited in a seventeenth aspect based on the sixteenth aspect, is characterized by comprising an event data processing step of extracting only a symbol string desired by the user among the second input symbol strings converted in the second voice recognition step, and of storing the extracted symbol string in the event data storage section.

An interactive method recited in an eighteenth aspect based on the sixteenth or seventeenth aspect, is characterized by comprising a conversation characteristic control step of grasping conversation characteristics of the user based on the input symbol string, and of changing the output symbol string in accordance with the grasped conversation characteristics.

An interactive method recited in a nineteenth aspect based on the sixteenth aspect, is characterized by comprising: a storage step of storing synonyms and relevant words synonymous with and relevant to words uttered by the user; and an association function step of extracting the synonyms and relevant words synonymous with and relevant to words uttered by the user from the storage section based on the input symbol string, and of outputting the extracted synonyms and relevant words to the conversation pattern processing section.

The invention recited in a twentieth aspect is a two-way interactive method of allowing a plurality of interactive systems each conducting an interactive processing for interaction with a user to communicate with one another, and is characterized by comprising: a voice recognition processing step of recognizing the voice uttered by a user, and of converting the recognized voice into an input symbol string; a conversation pattern processing step of inputting the input symbol string, and of outputting an output symbol string corresponding to the input symbol string based on a conversation pattern described in advance; a voice synthesis processing step of converting the output symbol string into voice; a voice output section outputting and uttering the voice obtained in the voice synthesis processing step; an event data transmission and reception step of transmitting the input symbol string to the other interactive system as event data, and of receiving event data consisting of the symbol string from the other interactive system; and an event data storage step of storing the event data received from the other interactive system.

A two-way interactive method recited in a twenty first aspect based on the twentieth aspect, is characterized by comprising: an input step of inputting a privacy protection command of the user; and a privacy protecting function step of transmitting the event data acquired by utterance of the user to the other interactive system if the privacy protection command is not inputted from the input section, and not transmitting the event data acquired by the utterance of the user to the other interactive system if the privacy protection command is inputted from the input section.

A two-way interactive method recited in a twenty second aspect based on the twentieth aspect, is characterized by comprising: a conversation characteristic control step of grasping conversation characteristics of the user based on the input symbol string, and of changing the output symbol string in accordance with the grasped conversation characteristics.

A two-way interactive method recited in a twenty third aspect based on the twentieth aspect, is characterized by comprising: a storage step of storing synonyms and relevant words synonymous with and relevant to words uttered by the user; and an association function step of extracting the synonyms and relevant words synonymous with and relevant to words uttered by the user from the storage section based on the input symbol string, and of outputting the extracted synonyms and relevant words to the conversation pattern processing section.

A two-way interactive method recited in a twenty fourth aspect based on the twentieth aspect, is characterized by comprising: a second recognition processing step of recognizing broadcast voice from a broadcast station, and of converting the recognized broadcast voice into second input symbol strings; and an event data storage step of storing the second input symbol strings as event data.

The invention recited in a twenty fifth aspect is a computer readable recording medium for recording a program for allowing a computer to execute by comprising: a voice recognition processing step of recognizing voice uttered by a user, and of converting the recognized voice into an input symbol string; a conversation pattern processing step of inputting the input symbol string, and of outputting an output symbol string corresponding to the input symbol string based on a conversation pattern described in advance; a voice synthesis processing step of converting the output symbol string into voice; a voice output step of outputting and uttering the voice obtained in the voice synthesis processing step; and a conversation characteristic control step of grasping conversation characteristics of the user based on the input symbol string, and of changing the output symbol string in accordance with the grasped conversation characteristics.

BRIEF DESCRIPTION OF THE DRAWINGS

FIG. 3 shows an event data table provided in the interactive system in the first embodiment;

FIG. 4 shows an event attribute table provided in the interactive system in the first embodiment;

DESCRIPTION OF THE PREFERRED EMBODIMENTS

Description will be given hereinafter to the embodiments of an interactive system, an interactive method, a two-way interactive system, a two-way interactive method and a recording medium according to the present invention, with reference to the accompanying drawings.

First Embodiment

Figure 1:
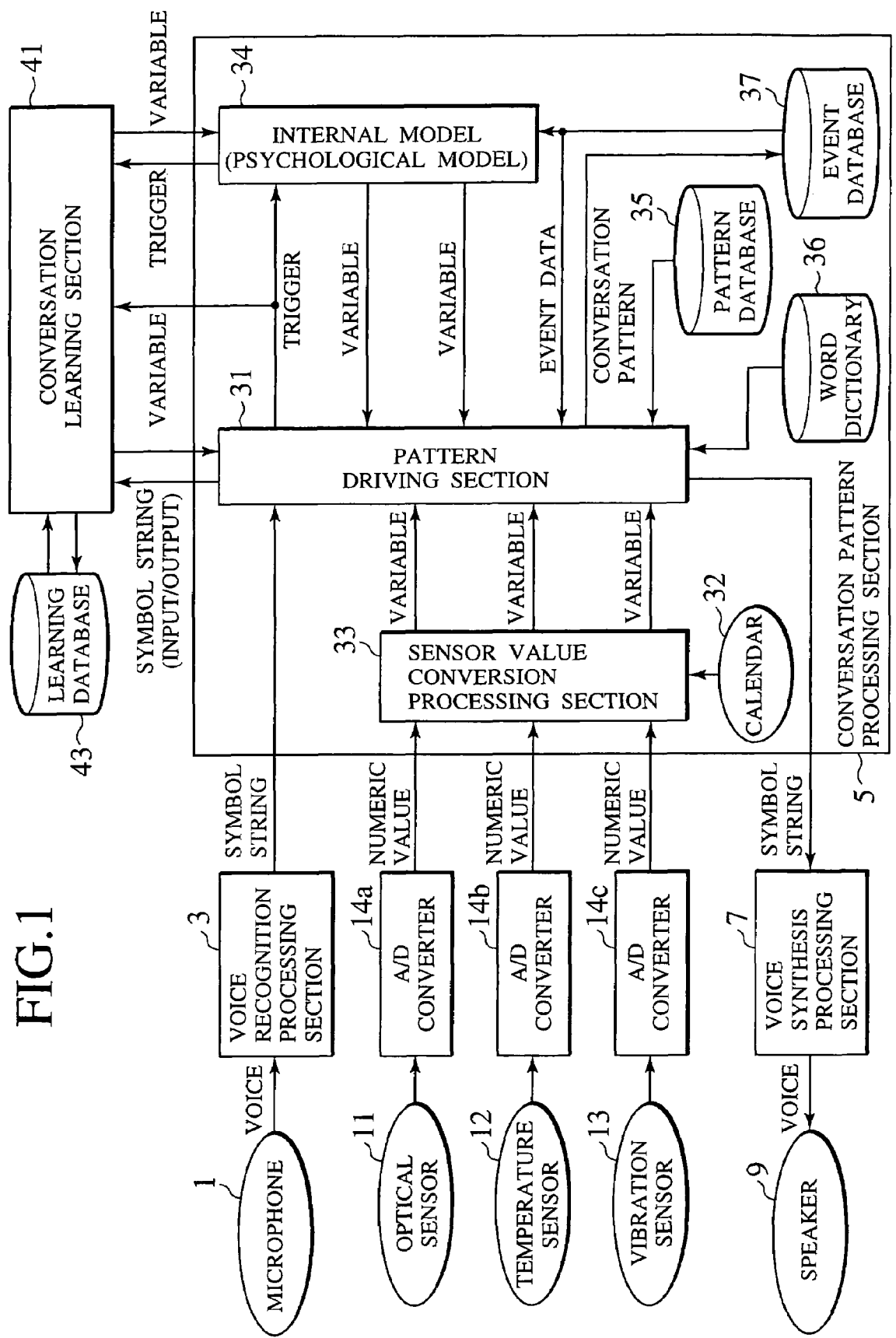
FIG. 1 is a block diagram of the functions of an interactive system in the first embodiment according to the present invention.
Figure 2:
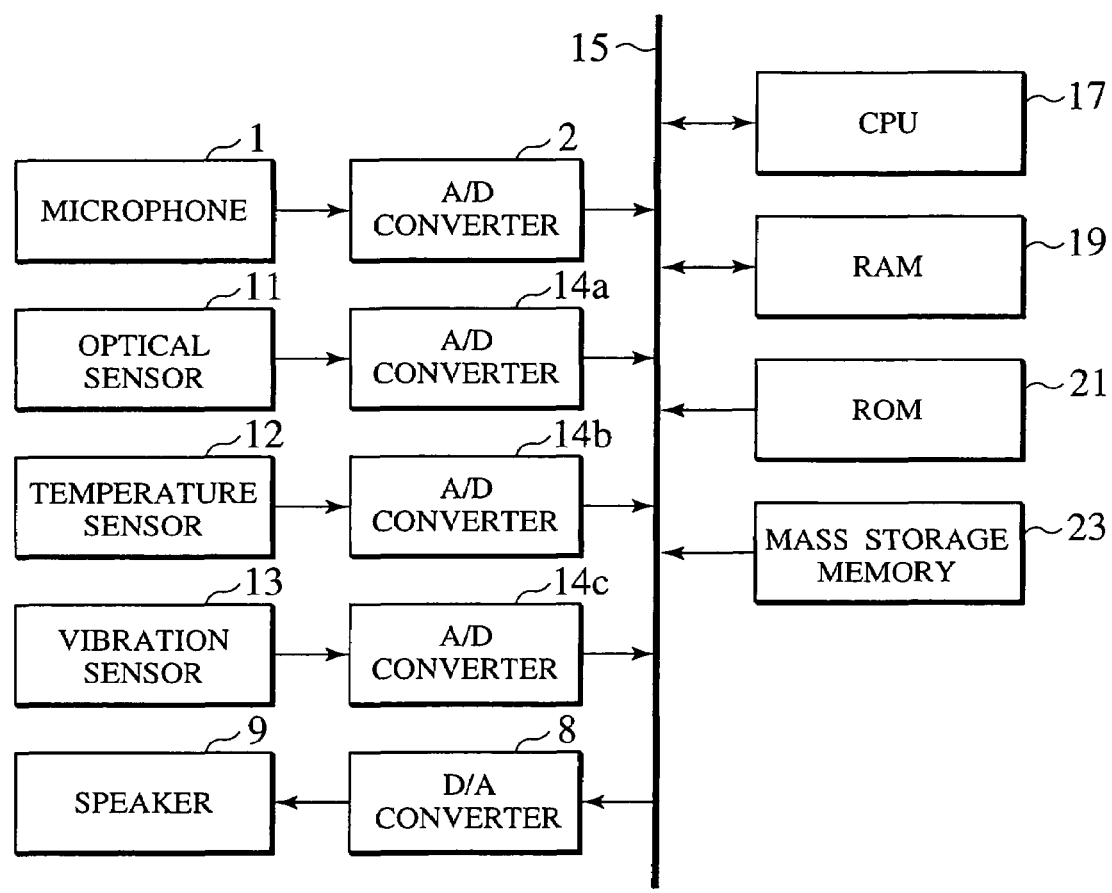
FIG. 2 is a block diagram of the hardware of the interactive system in the first embodiment.

FIG. 1 is a block diagram of the functions of an interactive system in the first embodiment. FIG. 2 is a block diagram of the hardware of the interactive system in the first embodiment. The interactive system shown in FIG. 1 is mounted on a vehicle and holds a voice conversation with a user such as a driver.

The interactive system has a microphone 1 inputting voice uttered by a user, a voice recognition processing section 3 recognizing the voice inputted from the microphone 1 and converting the recognized voice into a symbol string (corresponding to an inputted symbol string), a conversation pattern processing section 5 controlling the conversation with the user based on the symbol string converted by the voice recognition processing section 3 and outputting a symbol string (corresponding to an outputted symbol string) suited for the user to a voice synthesis processing section 7, the voice synthesis processing section 7 converting the symbol string from the conversation pattern processing section 5 into voice, and a speaker 9 outputting and uttering the voice from the voice synthesis processing section 7.

The conversation pattern processing section 5 corresponds to a conversation characteristic control section and has a pattern driving section 31, a calendar (clock) 32, a sensor value conversion processing section 33, an internal model (psychological model) 34, a pattern database 35, a word dictionary 36 and an event database 37.

The pattern driving section 31 inputs a symbol string from the voice recognition processing section 3 and outputs a symbol string corresponding to the inputted symbol string based on a conversation pattern described in advance. The conversation pattern described in advance is a pattern in which the inputted symbol string corresponds to a symbol string to be outputted and stored in the pattern database 35.

The interactive system processes not only the voice made by a user but also inputs from external sensors. The external sensors involve an optical sensor 11 detecting light, a temperature sensor 12 detecting temperature, a vibration sensor 13 detecting vibration, a calendar 32 indicating dates and the like. A/D converters 14a to 14c are provided to correspond to the optical sensor 11, the temperature sensor 12 and the vibration sensor 13, respectively. Each of the A/D converters 14a to 14c numerically converts a sensor signal (analog signal) from the corresponding sensor into a digital signal and outputs the converted numerical information to the sensor value conversion processing section 33. The pitch, tone quality and the like of the voice from the microphone 1 may be numerically converted into a digital signal by the A/D converter and the obtained numerical information may be outputted to the sensor value conversion processing section.

The sensor value conversion processing section 33 converts numeric values (sensor values) from the A/D converters 14a to 14c into variables, respectively, and outputs the variables to the pattern driving section 31. The pattern driving section 31 deals with the numeric information and calendar information as variables, refers to these variables while processing conversation, and influences conversation flow and the like according to the conditional expression described in the conversational pattern.

The internal model 34 deals with a reaction accompanied by passage of time while the pattern driving section 31 deals with reactions for individual conversations. The internal model 34 inputs trigger information from the pattern driving section 31 if the pattern driving section 31 has detected, for example, a specific word, changes a model value indicating an internal state in response to the trigger information and outputs the changed model value to the pattern driving section 31 as a variable. The internal model 34 also performs a processing while referring to event data from the event data table 37.

The pattern driving section 31 inputs the variable from the internal model 34, refers to the variable while processing conversation, changes the word according to a conditional expression described in a conversation pattern, and influences conversation flow and the like. The pattern driving section 31 also stores information acquired from the user during conversation in the event database 37 as event data, or refers to event data from the event database 37. The interactive system cites part of the event data when making a voice and refers to the event data when interpreting the content of user's utterance.

The event database 37 has a event data table 38 storing event data as shown in FIG. 3, and an event attribute table 39 storing event attributes as shown in FIG. 4. The event data table 38 consists of a registration timestamp representing event data registered time, the acquisition means of the event data such as the system, the user and character broadcasting, the number of event data, data [0] of event data=data name, data [1]=attribute 1 and data [2]=attribute 2. Each of the data name, the attribute 1 and the attribute 2 consists of an attribute identifier (attribute ID) represented by an ID number and an attribute value.

In the event attribute table 39, attribute IDs and attribute names are stored for the respective attributes of events while being associated with one another as shown in FIG. 4. For example, if the attribute ID is '1001', the attribute name is "name of player: baseball". In the event data table 38, if the attribute ID is '1001', 'name of player: Shinjo' is stored as an attribute value.

Further, the interactive system has a conversation learning section 41 and a learning database 43. The conversation learning section 41 grasps conversation characteristics/topics and the like which are considered to be desirable for a user and controls the pattern driving section 31 based on the characteristics/topics thus grasped.

Due to this, the conversation learning section 41 utilizes, as evaluation indexes, a word used by the user with high frequency and the type of the word, a conversation pattern used by the user with high frequency, the continuity of conversation with respect to a specific topic/conversation content (the number of responses of conversation) and utterance time, the number of uttered words and the like of the user based on the input and output symbol strings from the pattern driving section, the trigger from the pattern driving section 31 and the variable from the internal model 34. Then, the conversation learning section 41 optimizes the conversation topic/conversation pattern/uttered words, the selection of word type, response interval (average conversation interval) of the system, the frequency/timing of active utterance from the system side and the like when the system utters. The pattern learning section 41 then outputs an average conversation interval and the like to the pattern driving section 31 and outputs a trigger to the internal model 34.

The conversation learning section 41 also holds the inputted information and generated information in the learning database 43 as learning data and refers to the learning data held by the learning database 43. The word dictionary 36 stores words, which words are read by the pattern driving section 31.

Next, in the hardware block diagram of the interactive system shown in FIG. 2, an A/D converter 2 converts voice from the microphone 1 into a digital signal and outputs the digital signal to a bus 15. A D/A converter 8 converts a symbol string from the bus 15 into an analog signal and outputs the analog signal to the speaker 9. A central processing unit (CPU) 17 executing processings, a random-access memory (RAM) 19, a read-only memory (ROM) 21 serving as a recording medium storing a control program for conducting a conversation processing, a mass storage memory 23, such as a hard disk, storing data are connected to the bus 15. The mass storage memory 23 is a storage device including the pattern database 35, the word dictionary 36, the event database 37 and the learning database 43 already described above. The control programs stated above may be stored in a CD-ROM or the like instead of the ROM 21.

Each of the voice recognition processing section 3, the voice synthesis processing section 7, the pattern driving section 31, the sensor value conversion processing section 33, the internal model 34 and the conversation learning section 41 is a function realized when the CPU 17 executes the control program stored in the ROM 21.

Figure 5:
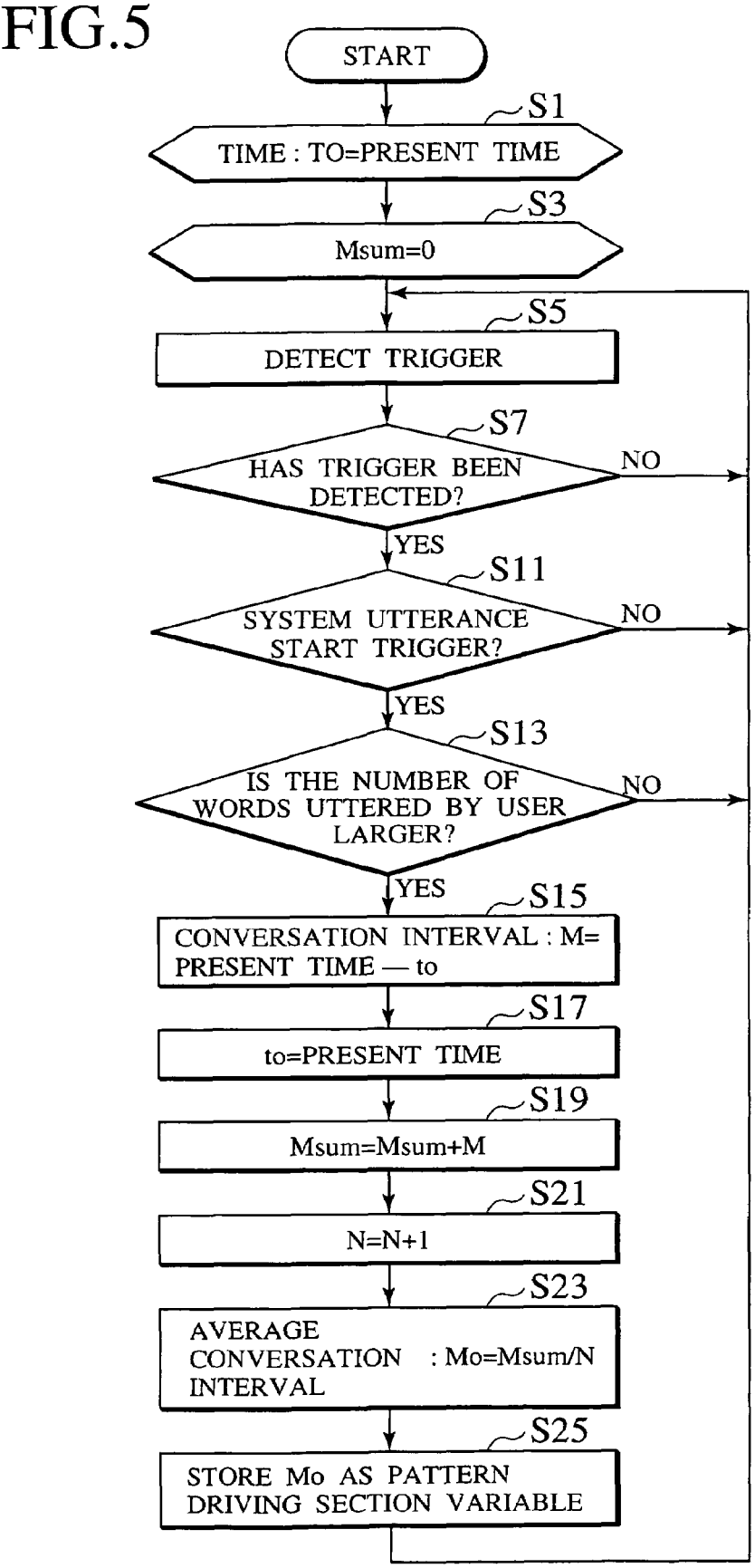
FIG. 5 is a flow chart showing an interactive method realized by the interactive system in the first embodiment.

Next, one example of the processings of the conversation learning function of the conversation learning section 41, which is the characteristic feature of the first embodiment, will be described with reference to FIG. 5. Using FIG. 5, logic for learning an appropriate conversation interval will be described.

First, a time t0 is set at a present time (in a step S1), and an overall interval of conversation Msum is set at '0' and the times of conversations N is set at '0' (in a step S3). Next, if the symbol string from user's utterance or the variable by the sensor signal from the optical sensor 11 or the like are inputted into the pattern driving section 31, a trigger is outputted from the pattern driving section 31 to the conversation learning section 41 and the detection of the trigger is, therefore, carried out (in a step S5).

If a trigger is detected (YES in a step S7), it is then determined whether the trigger is a system utterance start trigger (e.g., discriminated by a flag '01') (in a step S11). If the trigger is a system utterance start trigger, it is then determined whether the number of words uttered by the user is larger than a predetermined number (in a step S13).

If the number of words is larger than the predetermined number, a conversation interval M is obtained by subtracting the time t0 from the present time (in a step S15) and the time t0 is set as the present time (in a step S17). Further, the conversation interval M is added to the overall conversation interval Msum and the obtained value is set as the overall conversation interval Msum (in a step S19).

Next, the number N is incremented only by '1' and the obtained number is set as N (in a step S21). The overall conversation interval Msum is divided by the number N and the obtained value is set as an average conversation interval M0 (in a step S23). Then, the average conversation interval M0 is stored in the learning database 43 as the variable of the pattern driving section 31 (in a step S25). Also, the average conversation interval M0 is outputted to the pattern driving section 31 as a variable. Thereafter, the processing returns to the step S5 and the processings from the steps S5 to S25 are repeated.

If no trigger is detected in the step S7, the determination result of the step S11 is NO and the determination result of the step S13 is NO, then the processing instantly returns to the step S5.

As can be seen from the above, if the number of words uttered by the user is large, the conversation learning section 41 judges that the average conversation interval is appropriate, grasps and outputs the average conversation interval to the pattern driving section 31 as a variable. The pattern driving section 31 refers to the average conversation interval as a variable and outputs a symbol string to the voice synthesis processing section 7 at the average conversation interval.

Namely, the conversation learning section 41 grasps the conversation characteristics/topics and the like which appear to be appropriate for the user from the interaction between the user and the interactive system, and controls the pattern driving section 31 using the grasped characteristics/topics. Therefore, the interactive system can perform an interactive processing in accordance with the characteristics of individual users. Accordingly, it is possible to perform an interactive processing which does not bore the user and to thereby realize the removal of the boredom of the user such as a driver, the prevention of the user from falling into a doze and the like. Further, the CPU 17 executes the control program recorded on the ROM 21 serving as a recording medium, whereby it is possible to realize the processings of the conversation learning section 41.

Figure 6:
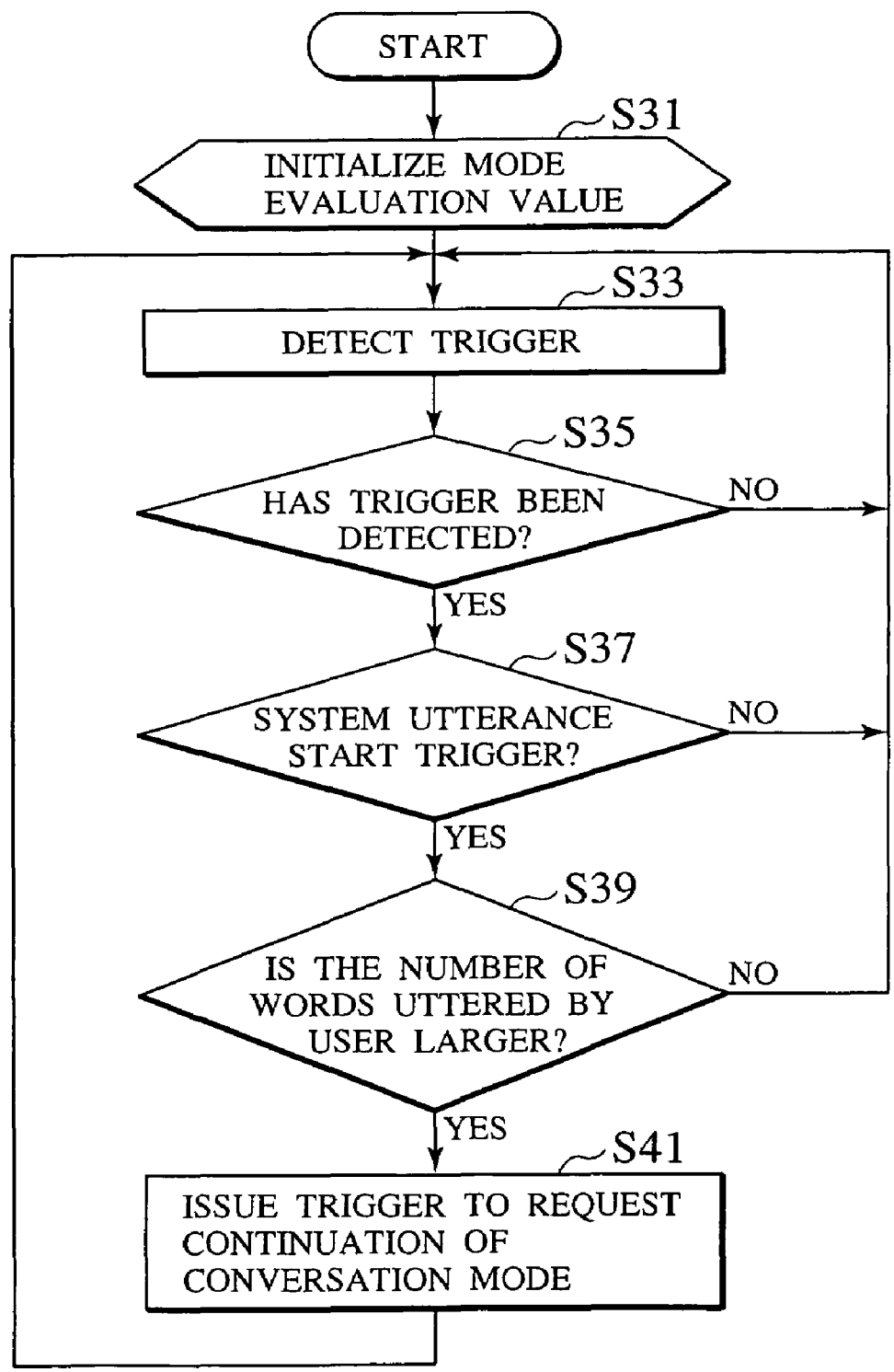
FIG. 6 is a flow chart showing the processings of a conversation learning section provided in the interactive system in the first embodiment.

The data communication between the conversation learning section 41 and the pattern driving section 31 has been described above. Next, the data communication between the conversation learning section 41 and the internal model 34 will be described. First, referring to FIG. 6, the processings of the conversation learning section 41 will be described. Initially, a mode evaluation value is initialized (in a step S31) and it is determined whether a trigger is detected from the pattern driving section 31 (in a step S33).

If a trigger is detected (YES in a step S35), it is then determined whether the trigger is a system utterance start trigger (in a step S37). If the trigger is a system utterance start trigger, it is then determined whether the number of words uttered by a user is larger than a predetermined number (in a step S39).

If the number of words is larger than the predetermined number, a conversation mode continuation request trigger (e.g., discriminated by a flag '10') is issued (in a step S41), and the processing returns to the step S33. If no trigger is detected in the step S35, the determination result is NO in the step S37 and the determination result is NO in the step S39, then the processing instantly returns to the step S33.

Figure 7:
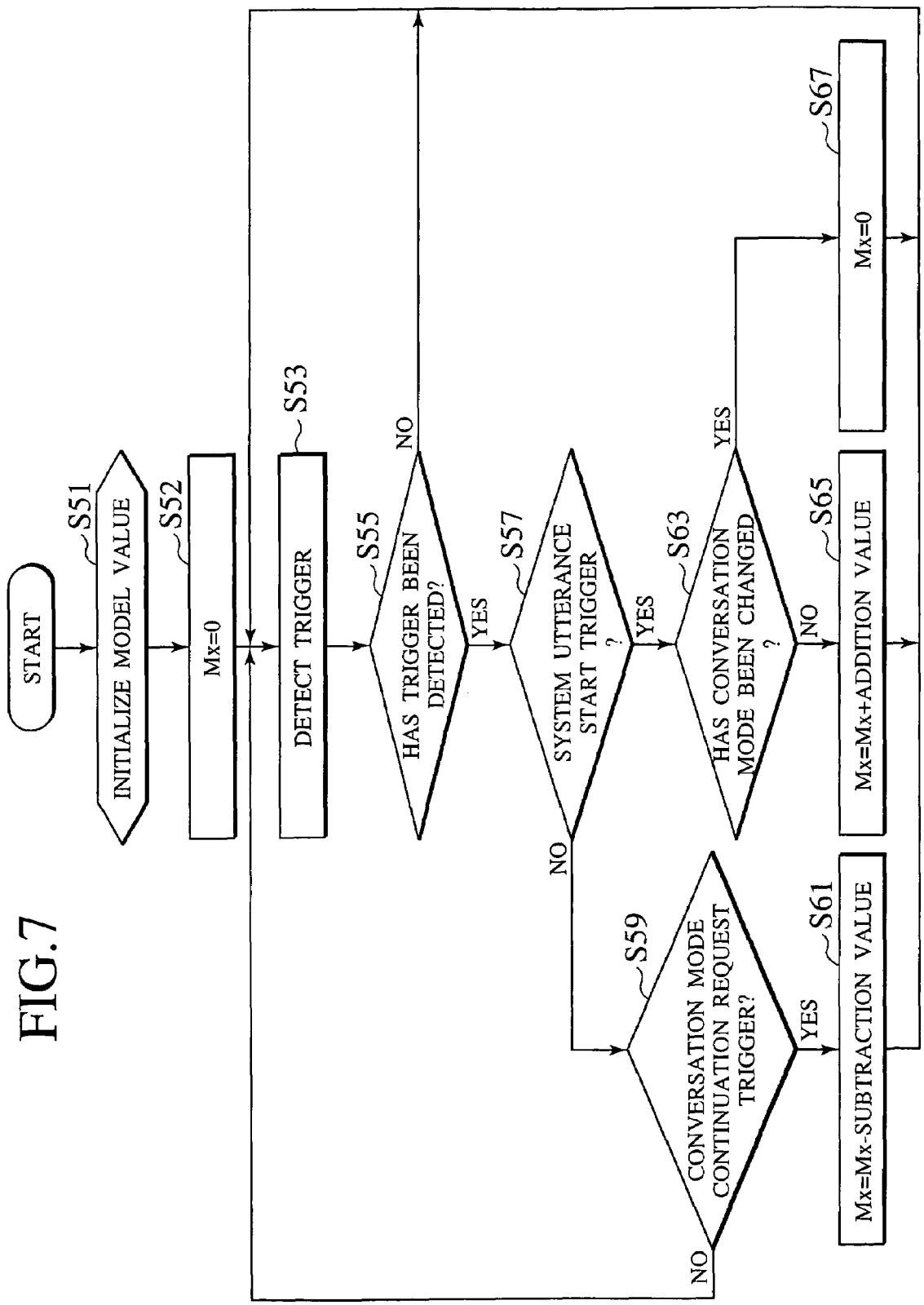
FIG. 7 is a flow chart showing the processings of an internal model provided in the interactive system in the first embodiment.

Next, referring to FIG. 7, the processings of the internal model 34 will be described. First, a model value is initialized (in a step S51) and a model value Mx is set at '0' (in a step S52). Then, a trigger is detected from the conversation learning section 41 (in a step S53).

If a trigger is detected (YES in a step S55), it is then determined whether the trigger is a system utterance start trigger (in a step S57). If the trigger is not a system utterance start trigger, it is then determined whether the trigger is a conversation mode continuation request trigger (in a step S59).

If the trigger is a conversation mode continuation request trigger, a subtraction value is subtracted from the model value Mx and the obtained value is set as a new model value Mx (in a step S61). The processing returns to the step S53.

In the step S57, if it is determined that the trigger is a system utterance start trigger, it is then determined whether the conversation mode has been changed (in a step S63). If the conversation mode has been changed, an addition value is added to the model value Mx and the obtained value is set as a new model value Mx (in a step S65). Then, the processing returns to the step S53. If the conversation mode has not been changed in the step S63, the model value Mx is set at '0' (in a step S67) and the processing returns to the step S53. In this way, the model value of the internal model 34 can be changed by the trigger from the conversation learning section 41 and the changed model value can be inputted, as a variable, into the conversation learning section 41.

Second Embodiment

Next, an interactive system and an interactive method in the second embodiment will be described.

Figure 8:
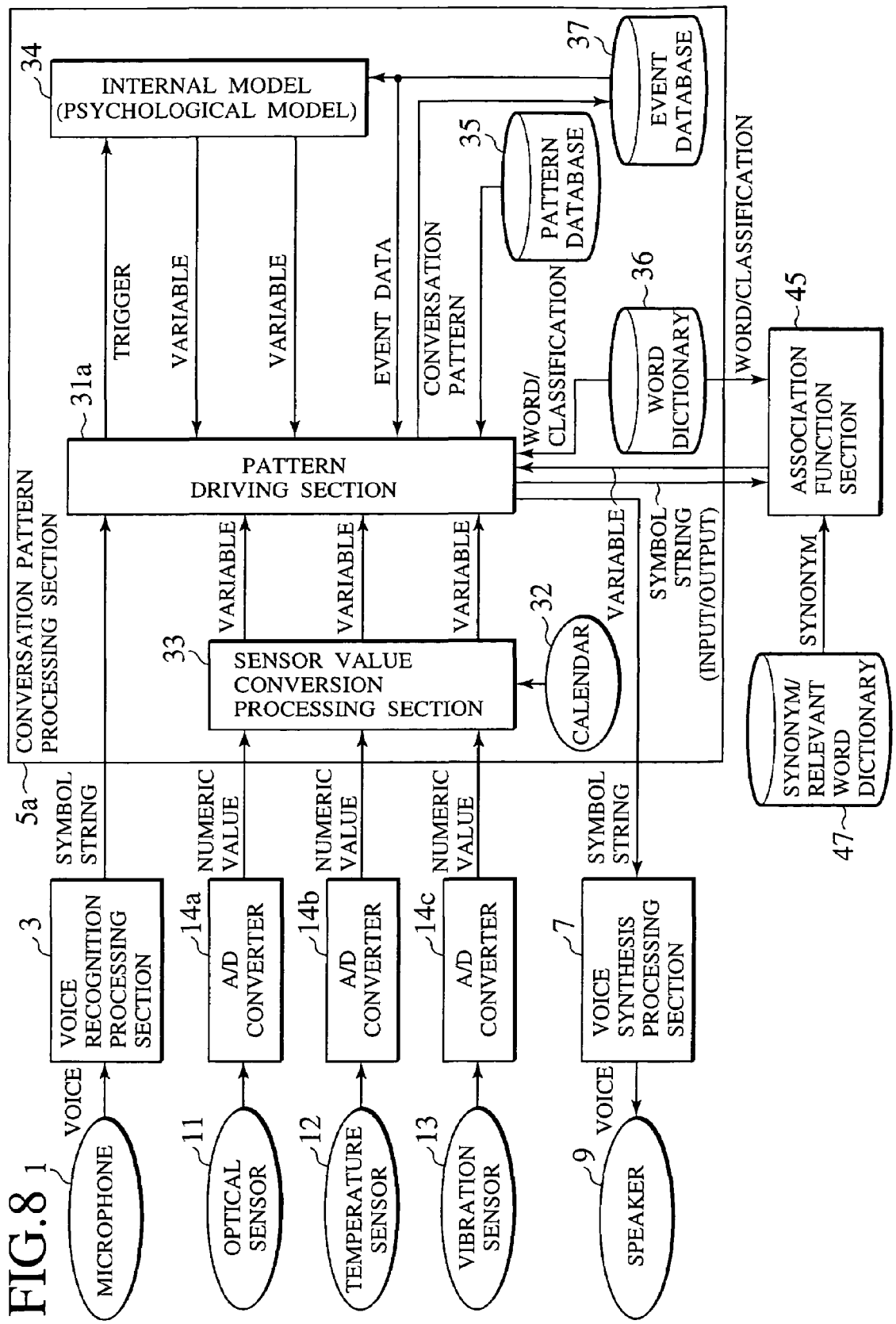
FIG. 8 is a block diagram of the functions of an interactive system in the second embodiment according to the present invention.

FIG. 8 is a block diagram of the functions of the interactive system in the second embodiment. The interactive system in the second embodiment is characterized by being provided with an association function section 45 and a synonym/relevant word dictionary 47 instead of the conversation learning section 41 and the learning database 43 shown in FIG. 1.

The remaining constituent elements of the interactive system shown in FIG. 8 are the same as those of the interactive system in the first embodiment shown in FIG. 1. The same elements are denoted by the same reference symbols as those in the first embodiment and no description will be given thereto.

The synonym/relevant word dictionary 47 stores synonyms and relevant words synonymous with and similar to words uttered by a user and those uttered by the system.

The association function section 45 extracts words relevant to conversation from the synonym/relevant word dictionary 47 based on inputted and outputted symbol strings from the pattern driving section 31a or the classification of words in the inputted and outputted symbol strings obtained while referring to a word dictionary 36, and outputs the extracted synonym/relevant word group to the pattern driving section 31a as variables. Namely, the association function section 45 refers to the synonym/relevant word dictionary 47, extracts synonyms and relevant words related to the words uttered by the user or those uttered by the system during conversation, and determines the content of system active utterance using the extracted synonyms/relevant words or the classification of the words.

Further, the association function section 45 selects an appropriate word from the word dictionary 36 based on conversation history information just before the stop of the chain of conversation when the chain of conversation is stopped (when the conversation is temporarily stopped), extracts words relevant to the selected word while referring to the synonym/relevant word dictionary 47, and outputs the extracted words to the pattern driving section 31a. At the time of the next system active utterance (i.e., when the system makes an active utterance), the interactive system utters voice including the extracted words or event data including the extracted words.

Figure 9:
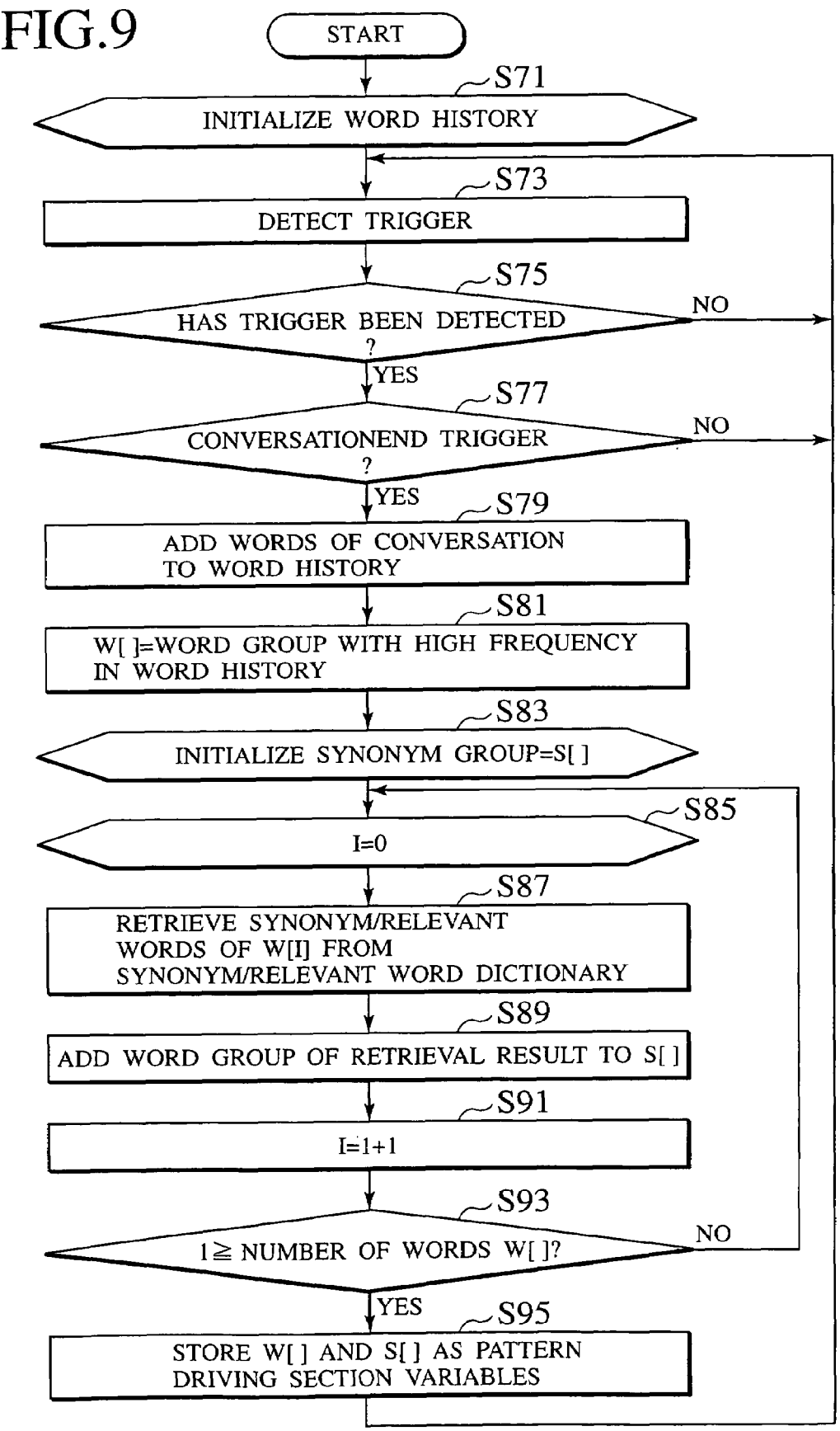
FIG. 9 is a flow chart showing an interactive method realized by the interactive system in the second embodiment.

Next, a concrete example of the processings of the association function section 45 will be described. In this example, logic for obtaining synonyms of a word appearing with high frequency will be described with reference to FIG. 9. First, a word history is initialized (in a step S73) and a trigger is detected from the pattern driving section 31a (in a step S75).

Next, if a trigger is detected (YES in the step S75), it is then determined whether the trigger is a conversation end trigger (e.g., discriminated by a flag '11') (in a step S77). If the trigger is a conversation end trigger, words in the conversation are added to the word history (in a step S79). Then, a word group W[ ] appearing with high frequency in the word history is created (in a step S81).

Next, a synonym group S[ ] is initialized (in a step S83) and I is set at '0' (in a step S85). Synonyms/relevant words of the word group W[I] are retrieved from the synonym/relevant word dictionary 47 (in a step S87) and the word group obtained as a result of the retrieval are added to the synonym group S[ ] (in a step S89).

Then, I is incremented only by '1' (in a step S91) and it is determined whether I becomes equal to or larger than the number of words of the word group W[ ] (in a step S93). If I is smaller than the number of words of the word group W[ ], the processing returns to the step S85.

If I becomes equal to or larger than the number of words of the word group W[ ], the word group W[ ] and the synonym group S[ ] are stored as variables of the pattern driving section 31a (in a step S95) and the processing returns to the step S73. If no trigger is detected in the step S75 and the determination result of the step S77 is NO, then the processing instantly returns to the step S73.

Next, concrete examples of the word group W[ ] and the synonym group S[ ] will be described. For example, it is assumed that the word history is {UEHARA (2), GIANTS (3), noodle (2), weather (3) . . . }. These items are rearranged into word groups as follows. Weather=44 points {weather, forecast, fine, cloudy, maximum temperature . . . }, baseball=38 points {UEHARA, GIANTS, strikeout, pitcher, . . . }, food=13 points {noodle, lunch, curry, beer, . . . }. If "weather" is selected as a word group appearing with high frequency, the word group W[ ]= {weather, forecast, fine, cloudy, maximum temperature, . . . }.

Next, synonyms/relevant words of the respective words in the word group W[ ] are extracted as follows. Weather→{atmospheric condition, meteorology, fine}, forecast→{weather forecast}, fine→{good weather, fine autumn day, bright and clear weather, fair}, cloudy→{cloud, clouded sky}. When a group of synonyms is generated, the synonyms S[ ]={atmospheric condition, meteorology, fair, weather forecast, good weather, fine autumn day}

The word group W[ ] and the synonym group S[ ] thus obtained are referred to by the pattern driving section 31a as variables. When the interactive system utters actively, the words relevant to the conversation thus far as well as event data including the words are retrieved and uttered.

In this way, the association function section 45 can select the next topic which appears to be able to be associated by the user from the content of the conversation thus far and give active utterance when the chain of the conversation is broken. This can make the active utterance of the interactive system conversation held not at random but having fixed continuity. Accordingly, it is possible to conduct an interactive processing which does not bore the user and thereby realize the removal of the boredom of the user such as a driver, the prevention of the user from falling into a doze and the like. Further, the CPU 17 executes the control program recorded on the ROM 21 serving as a recording medium, whereby the processings of the association function section 45 can be realized.

Third Embodiment

Figure 10:
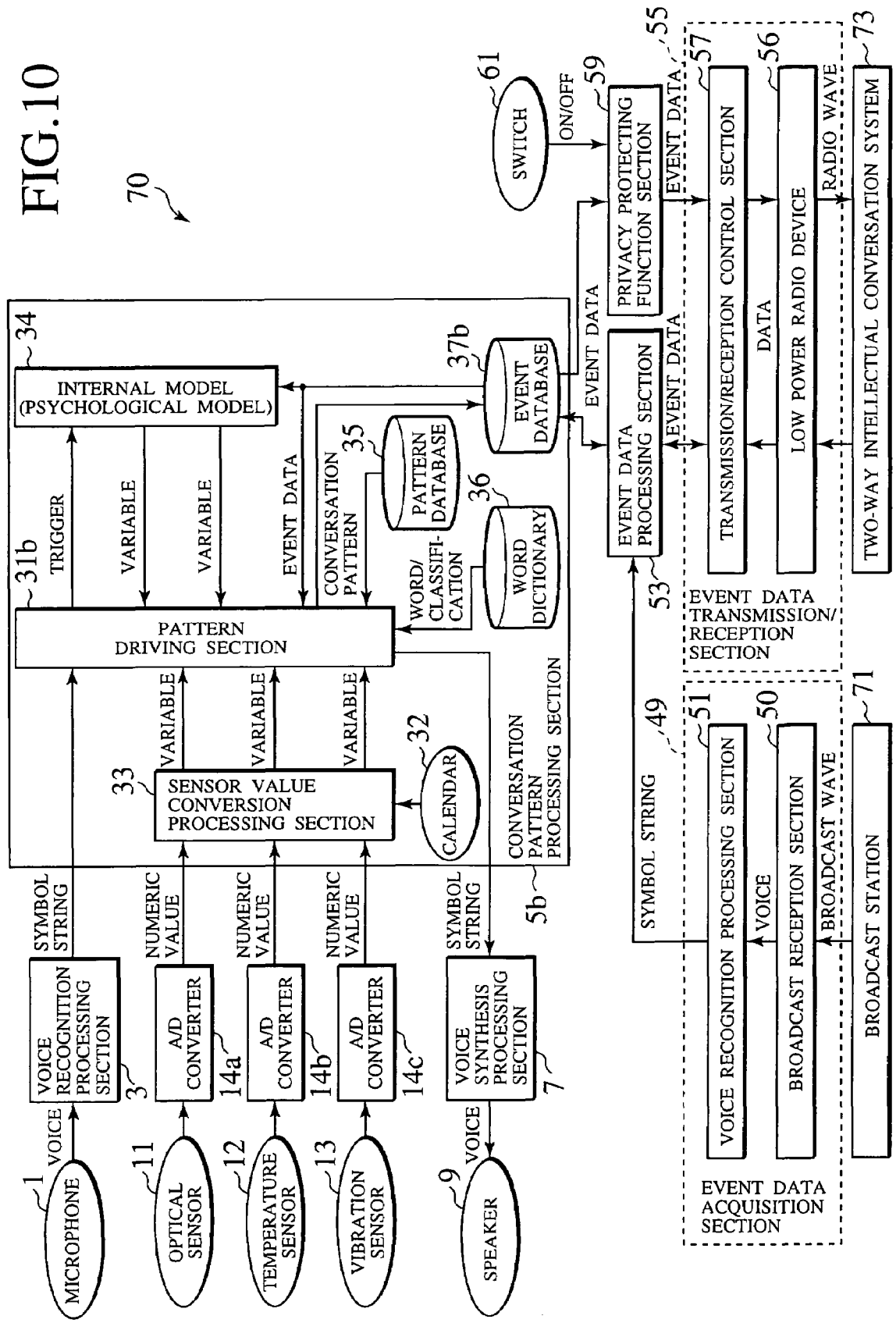
FIG. 10 is a block diagram of the functions of a two-way interactive system in the third embodiment according to the present invention.

FIG. 10 is a block diagram of the functions of a two-way interactive system in the third embodiment. The two-way interactive system in the third embodiment is provided with an interactive system 70 conducting an interactive processing for interaction between the system and a user, a broadcast station 71 and a two-way intellectual conversation system 73. The two-way intellectual conversation system 73 is the same in constitution as the interactive system 70. The interactive system 70 and the two-way intellectual conversation system 73 communicate with each other.

In addition, the interactive system 70 is characterized by being provided with an event data acquisition section 49, an event data processing section 53, an event data transmission/reception section 55, a privacy protecting function section 59, a switch 61 and the like instead of the conversation learning section 41 and the learning database 43 shown in FIG. 1, and by acquiring event data from voice broadcasting and event data from a low power radio device in addition to event data by the user's utterance.

The remaining constituent elements of the two-way interactive system shown in FIG. 10 are the same as those of the interactive system in the first embodiment shown in FIG. 1. Therefore, the same elements are denoted by the same reference symbols and description will not be given thereto.

Unlike data acquisition (VICS and the like) by character broadcasting (FM multiplex broadcasting) and data acquisition by mobile communication (portable telephone/PHS and the like), the event data acquisition section 49 converts a voice signal of TV/radio broadcasting from the broadcast station 71 into data by voice recognition and acquires the data as event data. The even data acquisition section 49 has a broadcast reception device 50 and a voice recognition processing section 51. The broadcast reception device 50 receives voice broadcasting from the broadcast station 71, and the voice recognition processing section 51 converts a voice signal included in the received voice broadcasting into a symbol string.

The event processing section 53 extracts data from the symbol string from the voice recognition processing section 51 according to a specific pattern (a rule described differently from an ordinary conversation pattern), and stores the extracted data in the event database 37b as event data.

Thus, the interactive system 70 can provide event data which a direct user does not have, to the user. Further, since the interactive system 70 can acquire event data from the voice broadcasting, the system 70 can acquire event data at low cost without the need to provide a special device.

Alternatively, the event data processing section 53 may extract only the data desired by the user from the symbol string from the voice recognition processing section 51, and store the extracted data in the event database 37b as event data. If so, only the event data desired by a user is stored in the event database 37b and it suffices that the event database 37b has low storage capacity.

On the other hand, the event data transmission/reception section 55 transmits and receives event data to and from the two-way intellectual conversation system 73. The event data transmission/reception section 55 has a low power radio device 56 and a transmission/reception control section 57. The low power radio device 56 transmits and receives event data to and from the two-way intellectual conversation system 73 over radio wave. The transmission/reception section 57 controls the transmission and reception of event data; i.e., transmits the event data received by the low power radio device 56 to the event database 37b through the event data processing section 53 and transmits event data from the privacy protecting function section 59 to the two-way intellectual conversation system 73 through the low power radio device 56.

If the switch 61 is turned on, the switch 61 inputs a privacy protection command to the privacy protecting function section 59 so as to suppress the transmission of event data on user's privacy uttered by the user. The privacy protecting function section 59 sends the event data acquired by user's utterance to the transmission/reception control section 57 if no privacy protection command is inputted from the switch 61, and does not send the event data acquired by the user's utterance to the transmission/reception control section 57 if the privacy protection command is inputted from the switch 61.

Next, the event data transmission/reception functions of the event data transmission/reception section 55 will be described. First, when the event data transmission/reception section 55 transmits a fixed carrier wave to the two-way intellectual conversation system 73, the two-way intellectual conversation system 73 transmits a response wave to the event data transmission/reception section 55 in response to the carrier wave. When receiving the reception wave from the two-way intellectual conversation system 73, the event data transmission/reception section 55 establishes communication with the two-way intellectual conversation system 73 through certain communication procedures.

The systems between which communication has been established, transmit data request bidirectionally. Data requirements (such as retrieval conditions and the range of date and time) are added to the data request. For example, if the two-way intellectual conversation system 73 receives a data request, the system 73 transmits requested data (which means data conforming to requirements if such requirements are designated). In turn, at the data requesting side or the interactive system 70 side, for example, the event data transmission/reception section 55 receives the data and stores the received data in the event database 37b through the event data processing section 53.

Further, the interactive system 70 receives an event data transmission request on specific conditions from the two-way intellectual conversation system 73, the event data transmission/reception section 55 transmits event data according to the request to the two-way intellectual conversation system 73.

As can be seen, the event data transmission/reception section 55 of a system having the low power radio device 56 transmits and receives event data to and from another system, whereby the interactive system 70 can acquire data from a plurality of other systems and easily increase the quantity of data which can be collected.

Moreover, while the communicable range of the lower power radio device 56 is relatively narrow, it is possible to transfer data even between systems distant from each other by a degree which exceeds the communicable range of the low power radio device 56 itself if data is transferred through a plurality of chained systems. If part of or all of the systems are mounted on a mobile body such as a vehicle, in particular, the range in which data is transmittable can be easily widened.

If data is received from another system, each system may store the received data in the event database 37b even without going through procedures for the establishment of communication.

Figure 11:
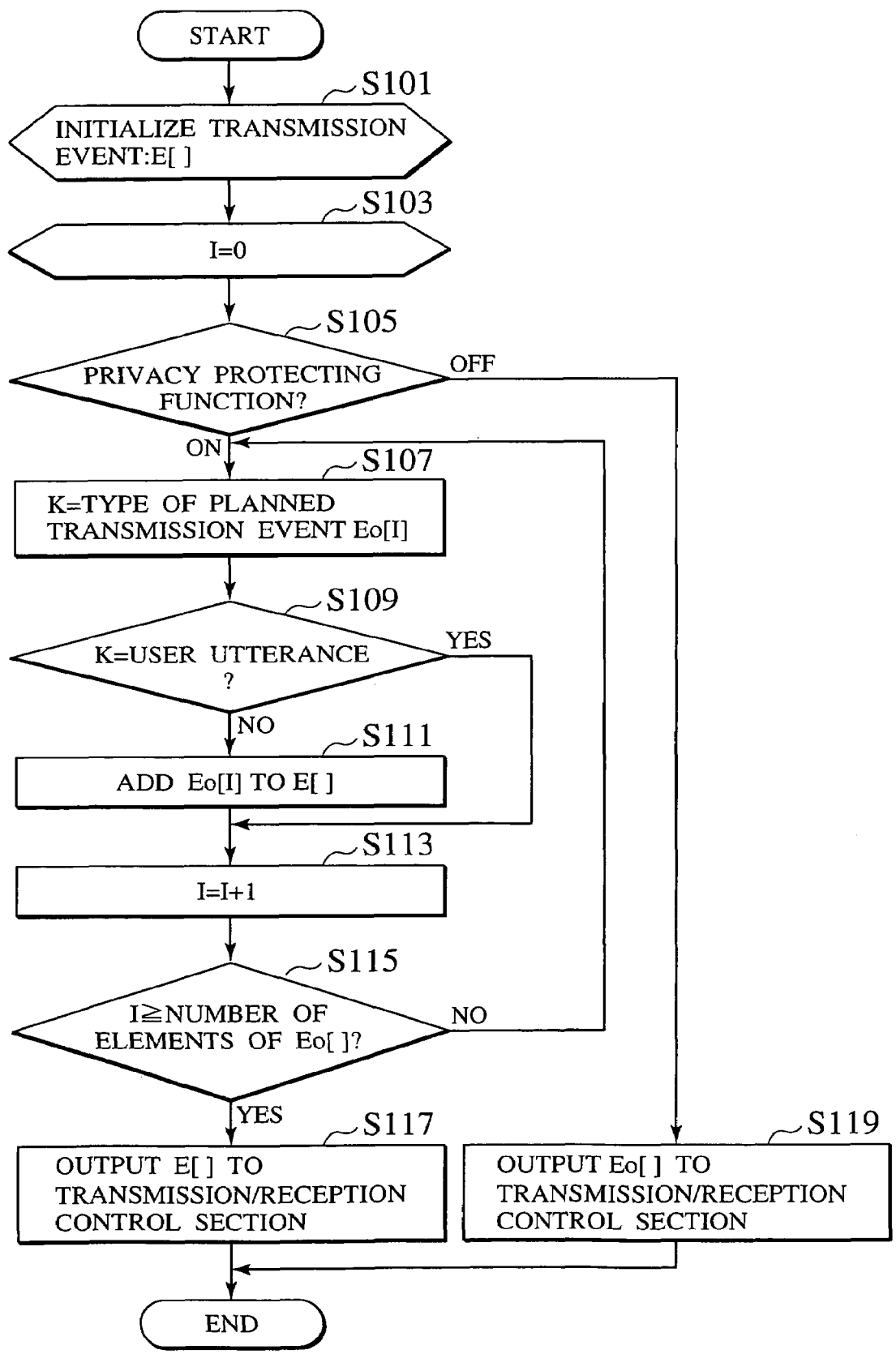
FIG. 11 is a flow chart showing an interactive method realized by the two-way interactive system in the third embodiment.

Next, the logic of the privacy protecting function for event data will be described with reference to FIG. 11. First, a transmission event E[ ] to be transmitted from the interactive system 70 to the two-way intellectual conversation system 73 is initialized (in a step S101) and I is set at '0' (in a step S103). Then, it is determined whether a privacy protecting function is turned on or off depending of whether the switch 61 is turned on or off (in a step S105). If the privacy protecting function is turned on, the planned transmission event is set at K and the type of E0[I] is determined (in a step S107).

Next, it is determined whether the planned transmission event K is uttered by a user (in a step S109). If the planned transmission event K is not uttered by the user, E0[I] is added to E[I] (in a step S111) and I is incremented only by '1' (in a step S113). If it is determined that the planned transmission event K is uttered by the user in the step S109, the processing instantly moves to the step S113.

It is then determined whether I is equal to or larger than the number of elements of E0[ ] (in a step S115). If I is smaller than the number of elements of E0[ ], the processing returns to the step S107 and the processings from the steps S107 to S115 are repeated. If I is equal to or larger than the number of elements of E0[ ], the transmission event E[ ] is outputted to the transmission/reception control section 57 (in a step S117).

On the other hand, if it is determined that the privacy protecting function is turned off in the step S105, the transmission event E[ ] is 1<outputted to the transmission/reception control section 57 as it is (in a step S119). Namely, the event data which has been checked by the privacy protecting function section 59 is transmitted to the two-way intellectual conversation system 73 through the low power radio device 73 by the transmission/reception control section 57.

As can be understood from the above, if the user issues a privacy protection command by either the switch 61 or voice or if the privacy protecting function section 59 receives a request from another system, the section 59 does not transmit the event data acquired by user's utterance. In other words, the privacy protecting function can suppress the content which the user oneself uttered to the system or the like from being inadvertently transmitted to other systems. It is noted that the event data received from voice broadcasting or from other systems are transmitted.

Furthermore, the CPU 17 executes the control program recorded on the ROM 21 serving as a recording medium, whereby it is possible to realize the processings of the voice recognition processing section 51, the event data processing section 53, the transmission/reception control section 57 and the privacy protecting function section 59.

Fourth Embodiment

Figure 12:
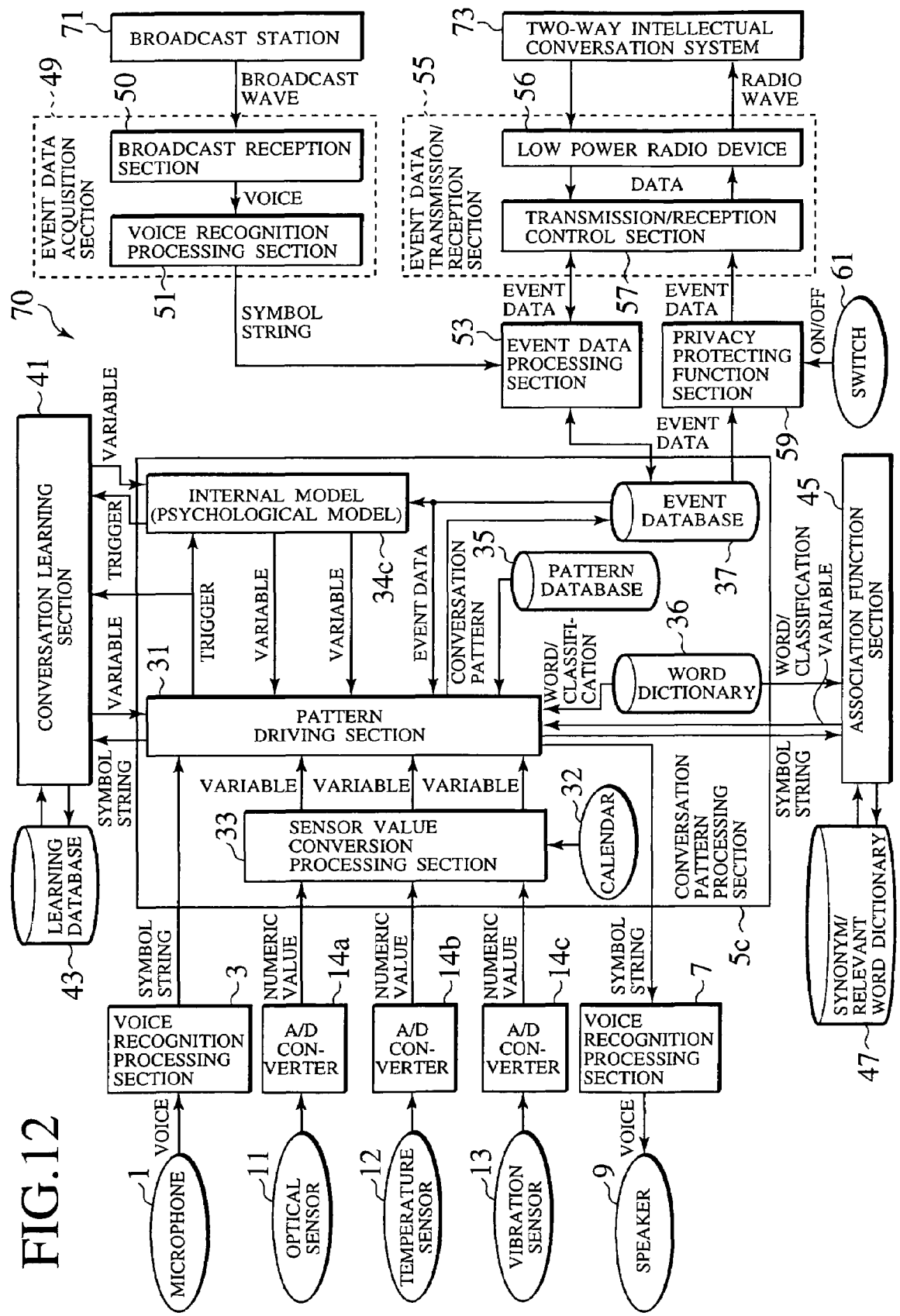
FIG. 12 is a block diagram of the functions of a two-way interactive system in the fourth embodiment according to the present invention.

Next, a two-way interactive system and a two-way interactive method in the fourth embodiment will be described. FIG. 12 is a block diagram of the functions of the two-way interactive system in the fourth embodiment. The two-way interactive system in the fourth embodiment is a combination of the interactive systems in the first and second embodiments and the two-way interactive system in the third embodiment.

The two-way interactive system in the third embodiment can obtain the advantages of the interactive systems in the first and second embodiments and those of the two-way interactive system in the third embodiment.

It is noted that the present invention should not be limited to the interactive systems in the first and second embodiments and the two-way interactive systems in the third and fourth embodiments. Needless to say, the present invention is also applicable to an interactive system which is a combination of the interactive system in the first embodiment and that in the second embodiment, a two-way conversation system which is a combination of the interactive system in the second embodiment and the two-way interactive system in the third embodiment and a two-way interactive system which is a combination of the interactive system in the first embodiment and the two-way interactive system in the third embodiment.

Moreover, each of the interactive systems in the first and second embodiments and the two-way interactive systems in the third and fourth embodiments is mounted on a vehicle and holds interaction with a user such as a driver. The present invention is also applicable to a nursing care system for elderly people and the like. The present invention is further applicable to a two-way nursing care system for establishing communication between a plurality of nursing care systems. In short, as long as the system is an interactive system for holding interaction with users, the present invention is applicable to other systems.

What is claimed is:

1. An interactive system comprising:
   a voice input section inputting voice uttered by a user;
   a voice recognition processing section recognizing the voice inputted by the voice input section, and converting the recognized voice into an input symbol string;
   a conversation pattern processing section inputting said input symbol string from the voice recognition processing section, and outputting an output symbol string corresponding to said input symbol string based on a conversation pattern described in advance;
   a voice synthesis processing section converting said output symbol string from the conversation pattern processing section into voice;
   a voice output section outputting and uttering the voice from the voice synthesis processing section; and
   a conversation characteristic control section grasping conversation characteristics of said user and changing said output symbol string in accordance with the grasped conversation characteristics, the grasped conversation characteristics based on the continuity of conversation with respect to a specific topic,
   wherein said conversation characteristic control section optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

2. A computer readable recording medium for recording a program for allowing a computer to execute, comprising:
   a voice recognition processing step of recognizing voice uttered by a user, and of converting the recognized voice into an input symbol string;
   a conversation pattern processing step of inputting said input symbol string, and of outputting an output symbol string corresponding to said input symbol string based on a conversation pattern described in advance;
   a voice synthesis processing step of converting said output symbol string into voice;
   a voice output step of outputting and uttering the voice obtained in the voice synthesis processing step; and
   a conversation characteristic control step of grasping conversation characteristics of said user and changing said output symbol string in accordance with the grasped conversation characteristics, the grasped conversation characteristics based on the continuity of conversation with respect to a specific topic, wherein said conversation characteristic control section optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

3. An interactive system comprising:

a voice input section inputting voice uttered by a user;

a voice recognition processing section recognizing the voice inputted by the voice input section, and converting the recognized voice into an input symbol string;

a conversation pattern processing section inputting said input symbol string from the voice recognition processing section, and outputting an output symbol string corresponding to said input symbol string based on a conversation pattern described in advance;

a voice synthesis processing section converting said output symbol string from the conversation pattern processing section into voice;

a voice output section outputting and uttering the voice from the voice synthesis processing section;

a storage section storing synonyms and relevant words synonymous with and relevant to words uttered by said user;

an association function section extracting the synonyms and relevant words synonymous with and relevant to words uttered by said user from said storage section based on a conversation history and said input symbol string from said conversation pattern processing section, and outputting said extracted synonyms and relevant words to said conversation pattern processing section, wherein said extracted synonyms and relevant words are referred to by the conversation pattern processing section as variables when outputting the output symbol string; and a conversation characteristic control section grasping conversation characteristics of said user and changing said output symbol string in accordance with the grasped conversation characteristics, the grasped conversation characteristics based on the continuity of conversation with respect to a specific topic, wherein said conversation characteristic control section optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

4. An interactive system comprising:

a voice input section inputting voice uttered by a user;

a first voice recognition processing section recognizing the voice inputted by the voice input section, and converting the recognized voice into a first input symbol string;

a conversation pattern processing section inputting said first input symbol string from the first voice recognition processing section, and outputting an output symbol string corresponding to said first input symbol string based on a conversation pattern described in advance;

a voice synthesis processing section converting said output symbol string from the conversation pattern processing section into voice;

a voice output section outputting and uttering the voice from the voice synthesis processing section;

a second recognition processing section recognizing broadcast voice from a broadcast station, and converting the recognized broadcast voice into second input symbol strings;

an event data storage section storing said second input symbol strings as event data in association with corresponding attribute identifiers; and a conversation characteristic control section grasping conversation characteristics of said user and changing said output symbol string in accordance with the grasped conversation characteristics, the grasped conversation characteristics based on the continuity of conversation with respect to a specific topic, wherein said conversation characteristic control section optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

5. An interactive system according to claim 4, comprising an event data processing section extracting only a symbol string desired by the user among said second input symbol strings converted by said second voice recognition section, and storing the extracted symbol string in said event data storage section.

6. An interactive system according to claim 4, comprising:

a conversation characteristic control section grasping conversation characteristics of said user based on said input symbol string from said conversation pattern processing section, and changing said output symbol string in accordance with the grasped conversation characteristics.

7. An interactive system according to claim 4, comprising:

a storage section storing synonyms and relevant words synonymous with and relevant to words uttered by said user; and an association function section extracting the synonyms and relevant words synonymous with and relevant to words uttered by said user from said storage section based on said input symbol string from said conversation pattern processing section, and outputting said extracted synonyms and relevant words to said conversation pattern processing section.

8. A two-way interactive system comprising a plurality of interactive systems each conducting an interactive processing for interaction with a user, the respective interactive systems communicating with one another, each of said interactive systems comprising:

a voice input section inputting voice uttered by a user;

a voice recognition processing section recognizing the voice inputted by the voice input section, and converting the recognized voice into an input symbol string;

a conversation pattern processing section inputting said input symbol string from the voice recognition processing section, and outputting an output symbol string corresponding to said input symbol string based on a conversation pattern described in advance;

a voice synthesis processing section converting said output symbol string from the conversation pattern processing section into voice;

a voice output section outputting and uttering the voice from the voice synthesis processing section;

an event data transmission and reception section transmitting said input symbol string to the other interactive system as event data, and receiving event data consisting of a symbol string from said other interactive system;

an event data storage section storing said received event data in association with corresponding attribute identifiers;

an input section inputting a privacy protection command of said user; and a privacy protecting function section transmitting said event data acquired by utterance of said user to said other interactive system if said privacy protection command is not inputted from the input section, and not transmitting said event data acquired by the utterance of said user to said other interactive system if said privacy protection command is inputted from the input section.

9. A two-way interactive system according to claim 8, comprising:

a conversation characteristic control section grasping conversation characteristics of said user based on said input symbol string from said conversation pattern processing section, and changing said output symbol string in accordance with the grasped conversation characteristics.

10. A two-way interactive system according to claim 8, comprising:

a storage section storing synonyms and relevant words synonymous with and relevant to words uttered by said user; and an association function section extracting the synonyms and relevant words synonymous with and relevant to words uttered by said user from said storage section based on said input symbol string from said conversation pattern processing section, and outputting said extracted synonyms and relevant words to said conversation pattern processing section.

11. A two-way interactive system according to claim 8, wherein a second recognition processing section recognizing broadcast voice from a broadcast station, and converting the recognized broadcast voice into second input symbol strings; and an event data storage section storing said second input symbol strings as event data.

12. An interactive method comprising:

a voice recognition processing step of recognizing voice uttered by a user, and of converting the recognized voice into an input symbol string;

a conversation pattern processing step of inputting said input symbol string, and of outputting an output symbol string corresponding to said input symbol string based on a conversation pattern described in advance in a conversation pattern processing section;

a voice synthesis processing step of converting said output symbol string into voice;

a voice output step of outputting and uttering the voice obtained in the voice synthesis processing step;

a storage step of storing synonyms and relevant words synonymous with and relevant to words uttered by said user;

an association function step of extracting the synonyms and relevant words synonymous with and relevant to words uttered by said user from said storage section based on a conversation history and said input symbol string, and of outputting said extracted synonyms and relevant words to said conversation pattern processing section, wherein said extracted synonyms and relevant words are referred to by the conversation pattern processing section as variables when outputting the output symbol string; and a conversation characteristic control step of grasping conversation characteristics of said user and changing said output symbol string in accordance with the grasped conversation characteristics, the grasped conversation characteristics based on the continuity of conversation with respect to a specific topic, wherein said conversation characteristic control step optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

13. An interactive method comprising:

a voice recognition processing step of recognizing voice uttered by a user, and of converting the recognized voice into an input symbol string;

a conversation pattern processing step of inputting said input symbol string, and of outputting an output symbol string corresponding to said input symbol string based on a conversation pattern described in advance;

a voice synthesis processing step of converting said output symbol string into voice;

a voice output step of outputting and uttering the voice obtained in the voice synthesis processing step; and a conversation characteristic control step of grasping conversation characteristics of said user and changing said output symbol string in accordance with the grasped conversation characteristics, the grasped conversation characteristics based on the continuity of conversation with respect to a specific topic, wherein said conversation characteristic control step optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

14. An interactive method comprising:

a first voice recognition processing step of recognizing voice uttered by a user, and of converting the recognized voice into a first input symbol string;

a conversation pattern processing step of inputting said first input symbol string, and of outputting an output symbol string corresponding to said first input symbol string based on a conversation pattern described in advance;

a voice synthesis processing step of converting said output symbol string into voice;

a voice output section outputting and uttering the voice obtained in the voice synthesis processing step;

a second recognition processing step of recognizing broadcast voice from a broadcast station, and converting the recognized broadcast voice into second input symbol strings;

an event data storage step of storing said second input symbol strings as event data in association with corresponding attribute identifiers; and a conversation characteristic control step of grasping conversation characteristics of said user and changing said output symbol string in accordance with the grasped conversation characteristics, the grasped conversation characteristics based on the continuity of conversation with respect to a specific topic, wherein said conversation characteristic control step optimizes a conversation topic, a conversation pattern, uttered words, a conversation response interval, utterance frequency and timing during the utterance based on words and a conversation pattern used by the user with high frequency, a specific topic, times of conversation responses and utterance time and the number of words uttered by the user.

15. An interactive method according to claim 14, comprising:

an event data processing step of extracting only a symbol string desired by the user among said second input symbol strings converted in said second voice recognition step, and of storing the extracted symbol string in said event data storage section.

16. An interactive method according to claim 14, comprising:

a conversation characteristic control step of grasping conversation characteristics of said user based on said input symbol string, and of changing said output symbol string in accordance with the grasped conversation characteristics.

17. An interactive method according to claim 14, comprising:

a storage step of storing synonyms and relevant words synonymous with and relevant to words uttered by said user; and an association function step of extracting the synonyms and relevant words synonymous with and relevant to words uttered by said user from said storage section based on said input symbol string, and of outputting said extracted synonyms and relevant words to said conversation pattern processing section.

18. A two-way interactive method of allowing a plurality of interactive systems each conducting an interactive processing for interaction with a user to communicate with one another, the method comprising:

a voice recognition processing step of recognizing the voice uttered by a user, and of converting the recognized voice into an input symbol string;

a conversation pattern processing step of inputting said input symbol string, and of outputting an output symbol string corresponding to said input symbol string based on a conversation pattern described in advance;

a voice synthesis processing step of converting said output symbol string into voice;

a voice output section outputting and uttering the voice obtained in the voice synthesis processing step;

an event data transmission and reception step of transmitting said input symbol string to the other interactive system as event data, and of receiving event data consisting of the symbol string from said other interactive system;

an event data storage step of storing said received event data in association with corresponding attribute identifiers;

an input step of inputting a privacy protection command of said user; and a privacy protecting function step of transmitting said event data acquired by utterance of said user to said other interactive system if said privacy protection command is not inputted from the input section, and not transmitting said event data acquired by the utterance of said user to said other interactive system if said privacy protection command is inputted from the input section.

19. A two-way interactive method according to claim 18, comprising:

a conversation characteristic control step of grasping conversation characteristics of said user based on said input symbol string, and of changing said output symbol string in accordance with the grasped conversation characteristics.

20. A two-way interactive method according to claim 18, comprising:

a storage step of storing synonyms and relevant words synonymous with and relevant to words uttered by said user; and an association function step of extracting the synonyms and relevant words synonymous with and relevant to words uttered by said user from said storage section based on said input symbol string, and of outputting said extracted synonyms and relevant words to said conversation pattern processing section.

21. A two-way interactive method according to claim 18, comprising:

a second recognition processing step of recognizing broadcast voice from a broadcast station, and of converting the recognized broadcast voice into second input symbol strings; and an event data storage step of storing said second input symbol strings as event data.

* * * * *